(12) United States Patent
Lacourse et al.

(10) Patent No.: US 11,668,673 B2
(45) Date of Patent: Jun. 6, 2023

(54) MITIGATING IMPACT OF ION BUILDUP ON PH SENSOR PERFORMANCE

(71) Applicant: ONSET COMPUTER CORPORATION, Bourne, MA (US)

(72) Inventors: Jacob Lacourse, Middleboro, MA (US); Frederick Sonnichsen, East Falmouth, MA (US)

(73) Assignee: Onset Computer Corporation, Bourne, MA (US)

( * ) Notice: Subject to any disclaimer, the term of this patent is extended or adjusted under 35 U.S.C. 154(b) by 326 days.

(21) Appl. No.: 15/729,589

(22) Filed: Oct. 10, 2017

(65) Prior Publication Data
US 2021/0231605 A1 Jul. 29, 2021

(51) Int. Cl.
*G01N 27/416* (2006.01)
*B08B 13/00* (2006.01)

(52) U.S. Cl.
CPC ......... *G01N 27/4167* (2013.01); *B08B 13/00* (2013.01); *G01N 27/4165* (2013.01)

(58) Field of Classification Search
USPC ........................................................ 324/438
See application file for complete search history.

(56) References Cited

U.S. PATENT DOCUMENTS

| | | | | |
|---|---|---|---|---|
| 2006/0096862 A1* | 5/2006 | Benton | ................ | G01N 27/283 204/431 |
| 2008/0122455 A1* | 5/2008 | Ohnishi | ................... | G01N 9/24 73/579 |

* cited by examiner

*Primary Examiner* — Farhana A Hoque
(74) *Attorney, Agent, or Firm* — NextWave IP Legal; Leon Fortin, Jr.

(57) ABSTRACT

A self-vibrating pH probe comprise a housing containing an electronic assembly to which is coupled a vibration source element so that at least a portion of vibrations caused by the vibration source element propagate to the electronic assembly, the vibration source element being controllable for at least on/off operation. The self-vibrating pH probe further comprising a pH probe member having a probe tip at a first end, the probe member extending from the housing and mechanically and electrically coupled by a second end to the electronic assembly so that at least a portion of vibrations propagating to the electronic assembly further propagate to the probe tip; and further including a processor coupled to the electronic assembly for coordinating operation of the vibration source element and operation of the pH probe member.

19 Claims, 6 Drawing Sheets

| Solution Class | Profile | Amplitude (% of max) | Sample delay (seconds) (pre/post) | PH range (low/high) |
|---|---|---|---|---|
| A1 | PULSE | 75 | 3/1 | 3/6 |
| A2 | BLOCK | 50 | 2/2 | 5/9 |
| V1 | BLOCK | 33 | 1.5/3 | 3/7 |
| D | BURST | 25 | 3/1 | 6/11 |
| E1 | PULSE | 80 | 2/3 | 1/5 |
| K | N/A | N/A | N/A | 2/5 |

FIG. 6

MITIGATING IMPACT OF ION BUILDUP ON PH SENSOR PERFORMANCE

BACKGROUND

Field

The inventive embodiments described herein and depicted in the accompanying figures generally relates to pH sensing.

Description of the Related Art

The inventive embodiments described herein and depicted in the accompanying figures specifically relates to methods and systems for reducing ion buildup and/or impacts of ion buildup on a pH sensor through mechanical means, such as direct and indirect vibration.

When pH probes are deployed in a solution, the probe itself builds up one or more ion layers on its outer surface near the pH sensing tip that impact the probe's ability to obtain consistent and accurate measurements. These layers may generally be related to a level of activity in the solution being measured. When a solution remains still, or exhibits little movement relative to the probe, the ion deposition may be most impactful. Movement of the solution around a pH sensor's element tends to reduce the amount of ion buildup. However, the degree of buildup that remains even with some movement of the solution may vary sufficiently over time to impact pH sensing performance.

While movement of the solution can deter ion buildup, randomly agitating a solution may likely negatively impact the pH probe's ability to consistently and accurately measure pH since the agitation may occur at critical times, such as when the pH in a solution is being measured. Therefore there remains a need of a pH probe that can consistently mitigate the impact of ion layer buildup.

SUMMARY

Methods and systems of ion mitigation described herein and depicted in the accompanying figures may facilitate mitigating impacts of ion buildup when sensing pH with a probe, such as disturbances to electrolytic media of the probe through probe-vibration induced dispersion of the ion buildup. Likewise, ion mitigation described herein may be accomplished by probe-proximal vibration of a solution being probed. Vibration may be direct, such as through contact vibration with a mechanical element attached to the probe. Vibration may be indirect, such as vibrating a housing of the probe, vibrating the solution proximal to the probe tip, and the like.

Methods and systems of ion mitigation describe herein and depicted in the accompanying figures may include a self-vibrating pH probe assembly, such as to mitigate disturbances to electrolytic media of the probe. To facilitate ion mitigation across a range of deployments and probe constructions, a self-vibrating pH probe assembly may offer selective vibration amplitude, selective vibration duration, selective vibration-to-sample delay timing, and the like. A self-vibrating pH probe may comprise an offset weight-rotary motor vibration source element. Alternatively a piezoelectric vibration source element may be used. Any comparable type of vibration source may be adapted for use to provide vibration for a self-vibrating probe.

Selective vibration operation may include at least one of vibration amplitude, duration, sample delay and the like being adjustable through use of an algorithm that combines pH sample history with at least one of amplitude, duration, and sample delay parameters associated with the pH samples in the sample history. Such an algorithm may process sample history to determine at least a plurality of samples that are close in value, such as within a tolerance band. A tolerance band may conform to a range of sample values, such as a set of at least a minimum and a maximum preferred pH value. Vibration history that correlates in time to these samples may also be processed to determine vibration control parameters, such as amplitude, duration, waveform shape, timing of vibration relative to sampling, and the like. Parameters that appear to be fairly consistent for sample values within the tolerance band may be marked or saved as preferred vibration control parameters. This algorithm is only exemplary. There are many other ways in which vibration control parameters may be set and adjusted.

In another example of ion mitigation, a vibration source may be disposed proximal to the probe tip. Vibration control parameters, such as amplitude, duration, sample delay and the like may be based on a physical relationship of the probe tip and the vibration source. If a vibration source is disposed proximal to the probe tip in a solution, then amplitude may be reduced to avoid inadvertently impacting the probe tip and/or causing excessive mechanical stress, and the like. If a vibration source is disposed further away from the probe tip, then amplitude may be increased. Similarly, for vibration sources that are disposed close to a probe tip, delay from vibration to probe may be reduced compared to distal disposal of the vibration source. These are merely examples of how a physical relationship between a vibration source and a probe time can impact vibration control parameters.

Methods and systems of ion mitigation for pH probing may include a means of dispersing ion buildup on a tip of a pH probe by vibrating at least one of (i) an electronic sensing module in mechanical communication with the pH probe; (ii) a tip of a pH probe with a vibration inducing member disposed proximal to the pH sensing tip; (iii) a tip of a pH probe with a vibration inducing member disposed in contact with a house of a sensing tip of the pH probe; (iv) solution proximal to the tip of the pH probe with a vibration inducing member disposed proximal to the sensing tip of the pH probe.

Methods and systems of ion mitigation for pH probing may include dispersing ion build on a pH probe through sample-time activated vibration of a pH probe. In an example of sample-time activated vibration, information about sampling activity, such as frequency, inter-sample delay, sample duration, sample solution type, required accuracy, required repeatability, and the like may be processed to determine a time relationship between a vibration action and a pH sample action. As a general rule, delays from vibration should be sufficient to insure that effects of vibration on pH sampling are minimized or at least below a maximum impact value. Delays from vibration to sample should be short enough so that fresh ion buildup does not occur, is minimized, or at least is below a maximum buildup estimate by the time sampling is complete.

Methods and systems of ion mitigation for pH probing may include dispersing ion buildup on a pH probe tip through selective solution disturbance proximal to a pH probe time coordinated in time with pH sample via the probe. Coordination may be based on a range of factors, including a model of ion dispersion from the probe tip. Such a model may take into consideration the type of probe material, probe sensing type, solution type or related parameters, such as viscosity and the like. In an example, solution stability may take X seconds after disturbance. Sample time may prefer to be delayed for Y seconds after solution stability. Sample duration may last Z seconds. Sample recovery time after completion of the sample duration to ensure residual impact on the probe is acceptable may be A seconds. Therefore a total time from vibration stop to vibration start may be X+Y+Z+A seconds.

Methods and systems of ion mitigation for pH probing may include calculating at least one of duration, delay time, amplitude and period for a vibration event to vibrate at least one of a pH probe and a sampling solution proximal to a tip of the pH probe based on at least two pH samples, one taken before and another taken after the vibrating event. Determining a difference between the two pH samples may indicate a degree of benefit provided by the vibration event. Generally, pH sensing should improve when performed in coordination with a well-calculated vibration control parameter set. If there is no substantive difference in the before and after vibration pH samples, then amplitude, duration, vibration shape, period, and a range of other parameters may be adjusted. Samples and vibration may be repeated while tracking both sample values and vibration control parameters with the goal of determining which vibration profile, or a range of vibration profiles provides for improved pH sampling. Further refinement may be possible using a comparable approach, perhaps with smaller adjustments in parameters and/or adjusting fewer parameters to facilitate calculating vibration control parameters that provide for consistently improved pH sampling.

Methods and systems of ion mitigation for pH probing may include a device adapted to vibrate at least one of a pH probe and a solution proximal to the probe tip, the device vibrating in response to a signal received. The signal maybe received from the pH probe, another device that may coordinate vibration and pH sampling activities, and the like. The device may vibrate in response to the signal and at least one of a measure of ion buildup on the probe tip detectable by the device, an estimate of ion buildup on the probe tip, a time duration between signal reception, a user preference, and the like. The signal may indicate at least one of vibration duration, vibration amplitude, vibration start time, target of vibration (tip or solution), a stop time of vibration, a period of no vibration, and the like.

Methods and system of ion buildup dispersal from a pH probe tip may include a self-vibrating pH probe that includes a housing containing an electronic assembly adapted to support detecting pH of an environment. A vibration source is disposed relative to the electronic assembly so that at least a portion of vibrations caused by the vibration source propagate to the electronic assembly, the vibration source being controllable for at least on/off operation. The self-vibrating pH probe further including a pH probe member having a probe tip at a first end, the probe member extending from the housing and mechanically and electrically coupled by a second end to the electronic assembly so that at least a portion of vibrations propagating to the electronic assembly further propagate to the probe tip. The self-vibrating pH probe also including a processor coupled to the electronic assembly adapted to coordinate operation of the vibration source and operation of the pH probe member. Coordinating operation of the vibration source includes controlling vibration amplitude. Coordinating operation of the vibration source includes controlling a vibration profile. Coordinating operation of the vibration source and operation of the pH probe member includes controlling when the vibration source is activated relative to when a sample of pH is taken by the pH probe. The processor may use an algorithm for controlling vibration produced by the vibration source. The algorithm facilitates adjusting at least one of vibration amplitude, vibration duration, delay between vibration and pH sampling by the processor. The self-vibrating pH probe vibration source may be a piezoelectric device, a MEMS device, an ultrasonic device, an offset-weight rotary device and the like. Coordinating operation of the vibration source includes calculating at least one of a duration, delay time, amplitude, and period for the vibrating.

Methods and system of ion buildup dispersal from a pH probe may include a method of dispersing ion buildup that may impact a pH probe comprising controlling a vibration source to cause vibration of a portion of the pH probe through direct coupling of the vibration element with a structural portion of the pH probe; wherein the vibration source is controlled by a processor that further controls pH sampling of a medium that is in contact with the portion of the pH probe. In this method, the processor executes a vibration control algorithm to control the vibration source, the algorithm comprising determining at least two controllable aspects of the vibration source selected from the list consisting of amplitude, oscillation frequency, duration, period, start time, stop time, delay between the stop time and the start time. Further in this method, vibrations produced by the vibration source occur synchronously with sampling the medium. In this further method, a delay between the vibrations and sampling the medium is determined by the processor in response to a class of the sampling medium. Yet further in this method a vibration control profile is determined by the processor in response to a class type classification of the sample medium. Still yet further in this method, a delay between the vibrations and sampling the medium is greater than a minimum predefined pre-sample delay. In this method there is a configurable offset between operation of the vibrating source and sampling of the pH of the medium.

Methods and system of ion buildup dispersal from a probe, a portion of which is immersed in a medium may include a method of dispersing ion buildup on a probe comprising vibrating the medium that is in contact with the portion of the probe with a vibration element that causes vibration of the medium proximal to the immersed portion of the probe through immersion of a portion of the vibration element in the medium and causing the vibration element to produce vibrations; wherein vibrations caused by the vibration element is controlled by a processor that further controls sampling of the medium via at least one sensor disposed at the immersed portion of the probe. In this method, vibrations produced by the vibration element occur synchronously with sampling the medium. In this method, a delay between the vibrations and sampling the medium is determined by the processor in response to a class of the sampling medium. In this method, a vibration control profile is determined by the processor in response to a class type classification of the sample medium. In this method, a delay between vibrations produced by the vibration element and sampling the medium is greater than a minimum predefined pre-sample delay.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 6 depicts a vibration control table indexed by solution classification type.

DETAILED DESCRIPTION

Figure 1:
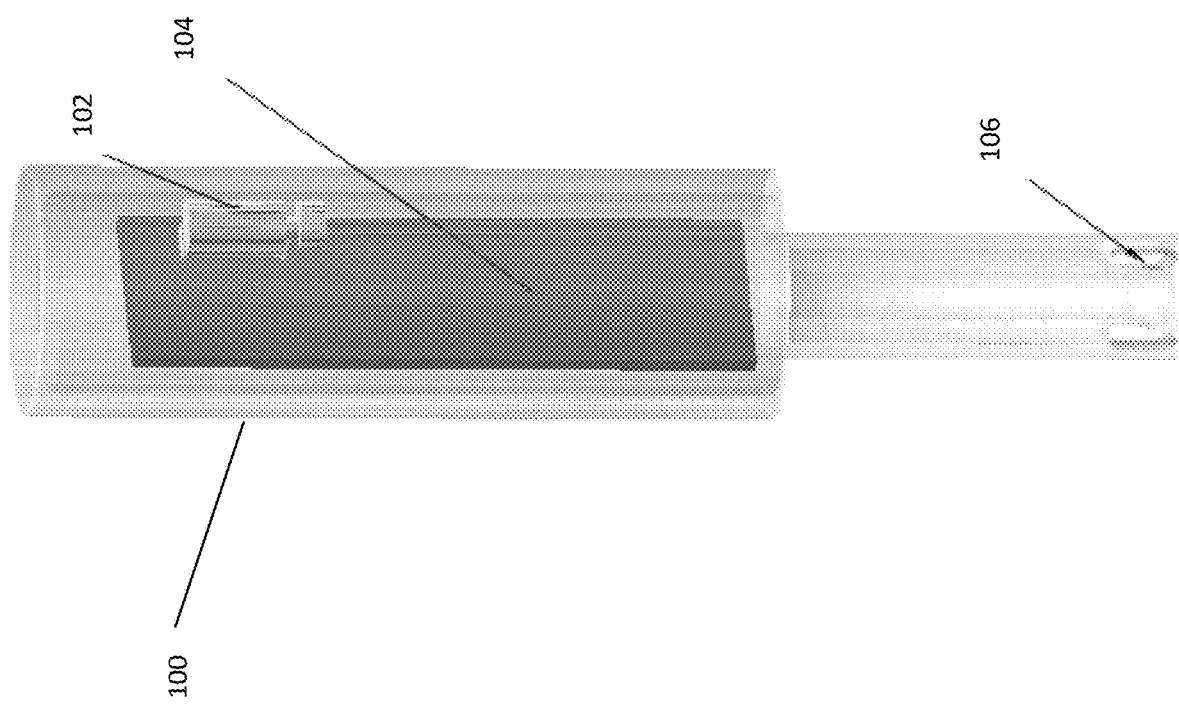
FIG. 1 depicts an embodiment of a self-vibrating pH probe.

Referring to FIG. 1, which depicts an embodiment of a self-vibrating pH probe, various elements of the self-vibrating probe are depicted. An exemplary pH probe, as depicted in FIG. 1 may include a housing 100 that may enclose operational elements of the probe, such as a printed circuit board (PCB) 104 or equivalent on which electronic components, such as processor analog-to-digital converter, and the like may be interconnected to facilitate electronic communication there between. The housing may couple the PCB 104 with a probe that terminates in a probe tip 106. In the example of FIG. 1, the PCB 104 may be mechanically coupled to the probe so that vibrations of the PCB 104 will propagate to the probe tip 106. To accomplish vibration of the probe tip 106 in this embodiment, a vibration source 102, such as a piezoelectric vibrator, an oscillating mechanical vibrator, an offset-weight rotary vibrator, MEMs, ultrasonic vibrator or the like may be configured so that vibrations produced by the vibration source propagates to at least one of the PCB 104 and the housing. Configuring the vibration source to facilitate propagating vibrations to at lest the PCB 104 may include mechanically securing the vibration source 102 to the PCB 104. The vibration source 102 may be operable by a processor, such as a processor mounted to the PCB 104 to perform various vibration modes, including pulse, ramp-up/ramp-down, oscillating, on/off vibration and the like.

In practice, activating the vibration source 102 will cause the PCB 104 on which it is mounted to vibrate. Elements coupled to the PCB 104, such as the probe and it's accompanying probe tip 106, would responsively vibrate. By activating the vibration source 102, the pH probe tip 106 would also vibrate, thereby contributing to mitigation of ion buildup on the probe tip 106, such as to avoid disturbances to electrolytic media of the probe.

Figure 2:
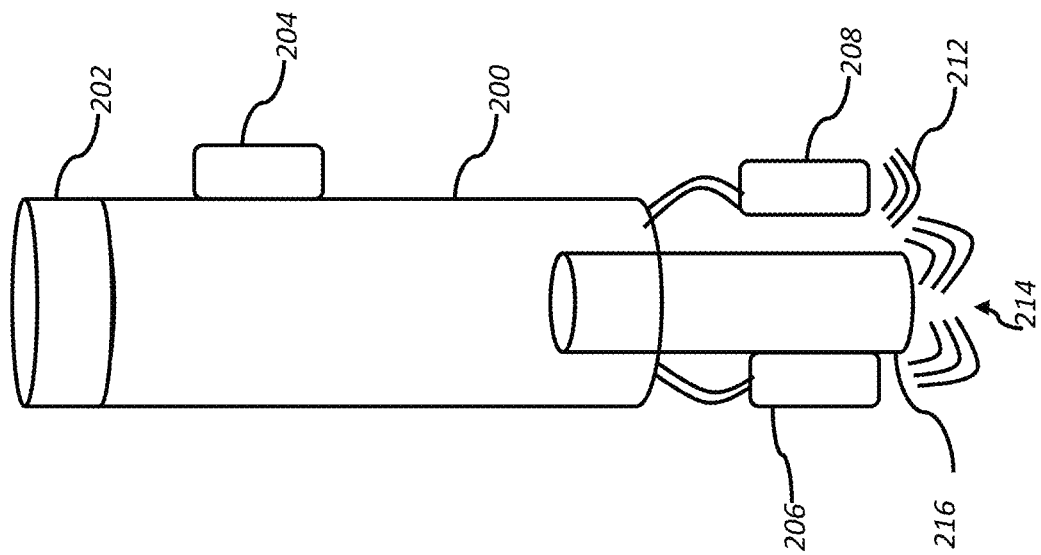
FIG. 2 depicts a pH probe with several optional vibrating element placements.

Referring to FIG. 2 that depicts alternate embodiments of a self-vibrating probe, a vibration source may be disposed in a variety of positions. Probe housing 200 may be mechanically coupled to the probe tip 216 so that vibration of the probe housing 200 may propagate to the probe tip 216 such that ion buildup on the probe tip 216 may be dispersed by the vibration. A vibration source may be disposed in a variety of positions relative to the probe body 200. In one embodiment, a vibration source 202 may be disposed on an end of the probe body 200, such as an end distal from the probe tip 216.

The end-mounted vibration source 202 may be in communication with a processor of the probe 200, so as to enable coordinated control of vibration and sampling as described elsewhere herein. In alternate embodiment, a vibration source 204 may be disposed on a side of the probe body 200. This configuration may facilitate retrofitting existing probes. A side-mounted vibration source 204 may be controlled through wired or wireless connection, such as a connection to a processor of the probe 200. Alternatively, top-mounted probe 202 and/or side mounted probe 204 may communicate wirelessly with a separate computing device that also facilitates coordinating vibration and sampling.

Alternate embodiments of a self-vibrating pH probe may include mounting a vibration source 206 to an outer surface of the probe tip 216, such as on a side surface as depicted in FIG. 2. Vibrations resulting from any of the vibration sources 202, 204, 206 and other similarly mounted vibration sources may cause the probe tip 216 to vibrate within a solution in which the probe tip 216 is disposed. The resulting vibration of the probe tip 216, which is depicted in FIG. 2 by element 214, may cause the buildup of ions on the probe tip 216 to disperse into the solution being probed. In the example embodiment of FIG. 2, the vibration source 206 may be connected via wiring to a control system of the probe 200. This may include being in communication with a vibration and sample control circuit, such as a processor or the like of the probe 200.

In yet an alternate embodiment, a vibration source 208 may be disposed proximal to, but not in contact with the probe tip 216. The embodiment of FIG. 2 depicts this vibration source 208 being attached to the probe 200, such as through a semi-rigid connection that facilitates stable deployment of this vibration probe 208 in proximity to the probe tip 216. In this embodiment, the vibration source 206 may cause the solution proximal to the probe tip 216 to effect a probed solution disturbance 212 that may cause the solution that is in contact with the probe tip to contribute to dispersion of ion buildup on the probe tip 216.

Figure 3:
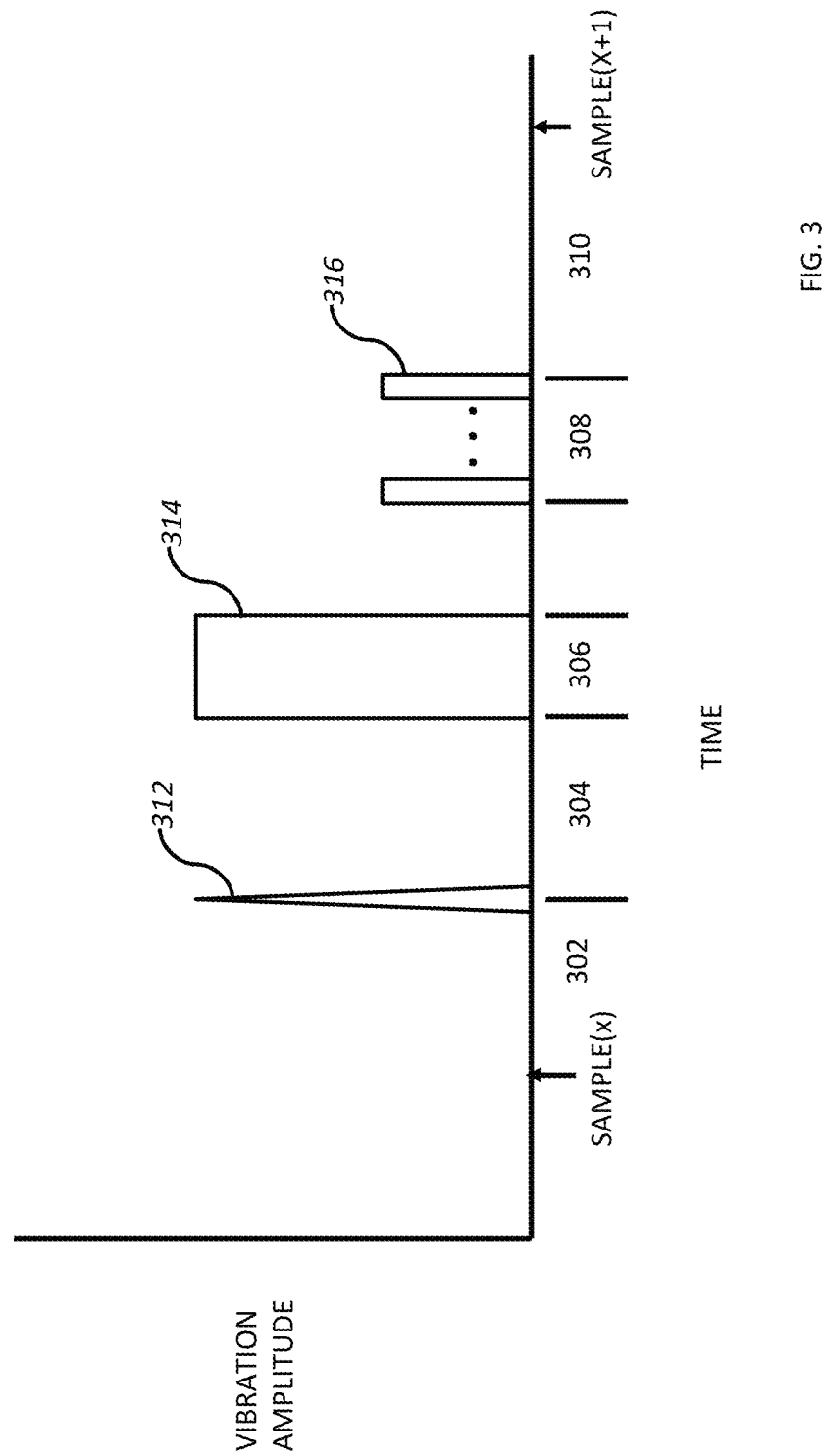
FIG. 3 depicts a timing chart of various vibration pulse durations, periods, and shapes.

Referring to FIG. 3 that depicts various vibration cycle types, shapes, durations, amplitudes and delays relative to a sample event. In general, vibration may be controlled so that there is at least a minimum delay after a sample event before vibration resumes. This after-sample delay 302 may be predefined, automatically determined, adjusted based on sample activity, and the like. The after-sample delay 302 may be determined from a start of a sample event, from an end of a sample event, or from a point of time between the start and end of the sample event. The general goal of such as delay is to ensure that sampling activity is complete so that vibration of the pH probe (e.g., tip, electronic controller, housing, and the like) will not adversely impact the sampling event or the processing of data collected during the sample event. Vibration occurring to close to a sample event may cause inadvertent changes in pH probe accuracy, for example.

There may be a variety of vibration profiles, including a vibration spike 312 in which a vibration element may be activated and then shortly thereafter deactivated, thereby generating a pulse of vibration to propagate throughout the probe and/or through the solution based on a location of the vibration element at the time of activation. A vibration spike 312 may be useful for periodic dispersion of ion build up while mitigating the potential for damage caused by more aggressive vibrating over and over.

Other vibration profiles may include a block vibration 314 that may persist for a variable duration, such as block vibration duration 306 as depicted in the embodiment of FIG. 3. The duration, amplitude, and other controllable characteristics of a block vibration 314 event may be predefined, configurable, automatically determined, and the like. Block vibration events 314 may be useful to cause a sustained period of vibration of a pH probe tip and/or a solution proximal to the tip. The block vibration duration 306 may be varied over time to cause a degree of randomness to the vibration events. Shortening and/or lengthening the block vibration duration 306 may beneficially effect ion dispersion. Additionally, varying the block vibration duration 306 may be useful in causing disturbance in the buildup of ion deposition by impacting the buildup at different times and for different lengths of time. Block vibration 314 may be a default vibration profile that may be adjusted over time based on analysis of pH samples, and the like. In an example, default block vibration duration 306 may be reduced for a range of sample events. Data from the reduced vibration sample events may be compared to data from the default vibration sample events. If the changes in sample data are not significant, such as falling within a sample tolerance range, reduced vibration may continue to be used to accomplish acceptable pH sampling with less vibration, which likely reduces energy consumption, may prolong a self-vibrating probe life, and the like.

An alternate vibration profile may include a sequenced vibration event 316. In such an event, a series of smaller scale block vibration events may be strung together into a single sequenced vibration event 316. The quantity of block vibrations and/or the total block burst vibration time 308 from the start of a first block vibration to the end of a last block vibration may be predefined, configured by a user, adjusted based on learning through machine learning techniques, and the like. Generally smaller amplitude vibration may have lower impact of distal points of a probe or the like. Therefore, such a vibration profile may be a default for vibration sources that are intended to be disposed proximal to a probe tip.

Time between vibration events and/or between a vibration event and a sample event may also be predefined, configurable and the like. In the example of FIG. 3, after-sample delay 302, inter vibration event pause 304 and pre-sample delay 310 may each be configured as distinct default values that get adjusted over time, for specific deployments, for specific probe types, for specific solution types, based on sample repeatability, and the like. Generally pre-sample delay 310 may be set so that any residual vibration effect, such as movement of a solution being sampled, is effectively minimized during the delay 310. Pre-sample delay 310 may be configured so that vibration impact is reduced, for example by at least 30 dB, to effect approximately an 87% reduction in vibration activity. Pre-sample delay 310 may be configured based on a model of vibration dampening for various vibration profiles, pH probes, solutions, and combinations thereof. In an example, a high amplitude block vibration profile 314 may impact such a vibration dampening model so that pre-sample vibration time 310 produced by the model will likely be greater than for a lower amplitude block vibration or spike vibration profile. Therefore, a system configured with flexible vibration source mechanisms, location, vibration profile, inter-vibration delays, amplitude and the like may facilitate configuring a universal self-vibrating probe that can be configured for a wide range of deployments.

Figure 4:
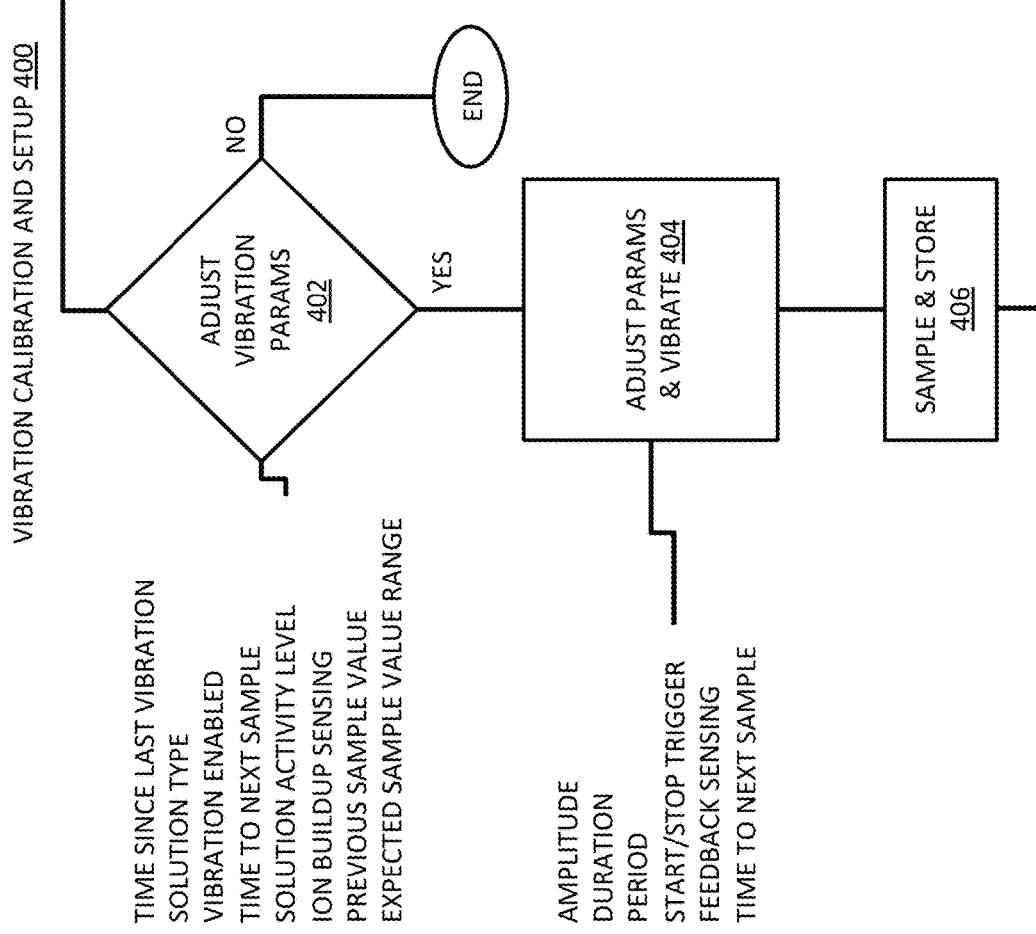
FIG. 4 depicts a flow chart of vibration calibration and setup.

Referring to FIG. 4 that depicts a calibration flow chart, vibration may be calibrated and setup. A general flow for vibration calibration may include a step of determining if vibration parameters could benefit from being adjusted 402. This step may be followed by a step of determining what parameters to adjust, adjusting at least those vibration parameters and performing a vibration event based on the adjusted vibration parameters 404. This step may be followed by a sampling event step 406 during which pH or some other aspect is measured, such as a measure of ion buildup or a measure of vibration of a pH probe time and the like. This step may be followed by step 402 to determine if vibration parameters might benefit from further adjustment.

Determining if vibration parameters need adjustment at step 402 may include processing a plurality of variables including, without exception: time since last vibration event, type of solution being sampled (certain aspects of the solution may be of significance, such as degree of movement, chemistry, and the like), whether vibration is enabled for this deployment, the time until a next sample event, ion buildup sensing (if available), previous pH sample value, expected pH sample value or range of values, and the like. Interdependencies of some of these variables, such as the degree of solution movement and the time to next sample may also need to be considered when determining what, if any vibration control parameters to adjust. A model of vibration control that takes into consideration most, if not all of these and potentially other parameters may be at the center of this process so that feedback from sources, such as timers, pH sensors, vibration feedback sensors, ion sensors and the like may be integrated into the model.

Step 404 may include determining which parameters to adjust based on, for example an output from step 402 that indicates that one or more parameters may benefit from adjustment. Once one or more vibration control parameters are targeted for adjustment, existing vibration control parameters, such as without limitation: amplitude, duration, profile, period, stop/stop trigger source and status, feedback, time to next sample, and others may be evaluated. The vibration control model may be used to determine a potential impact of adjusting the one or more targeted vibration control parameters. The potential impact may be evaluated and an updated set of vibration control parameters can be applied to a vibration event.

Step 406 may be triggered at the end of the vibration event, which may include a post-vibration delay period. The calibration loop of steps 402, 404, and 406 may be repeated at initial deployment, at present times during operation, after a number of pH sample events, and the like.

Figure 5:
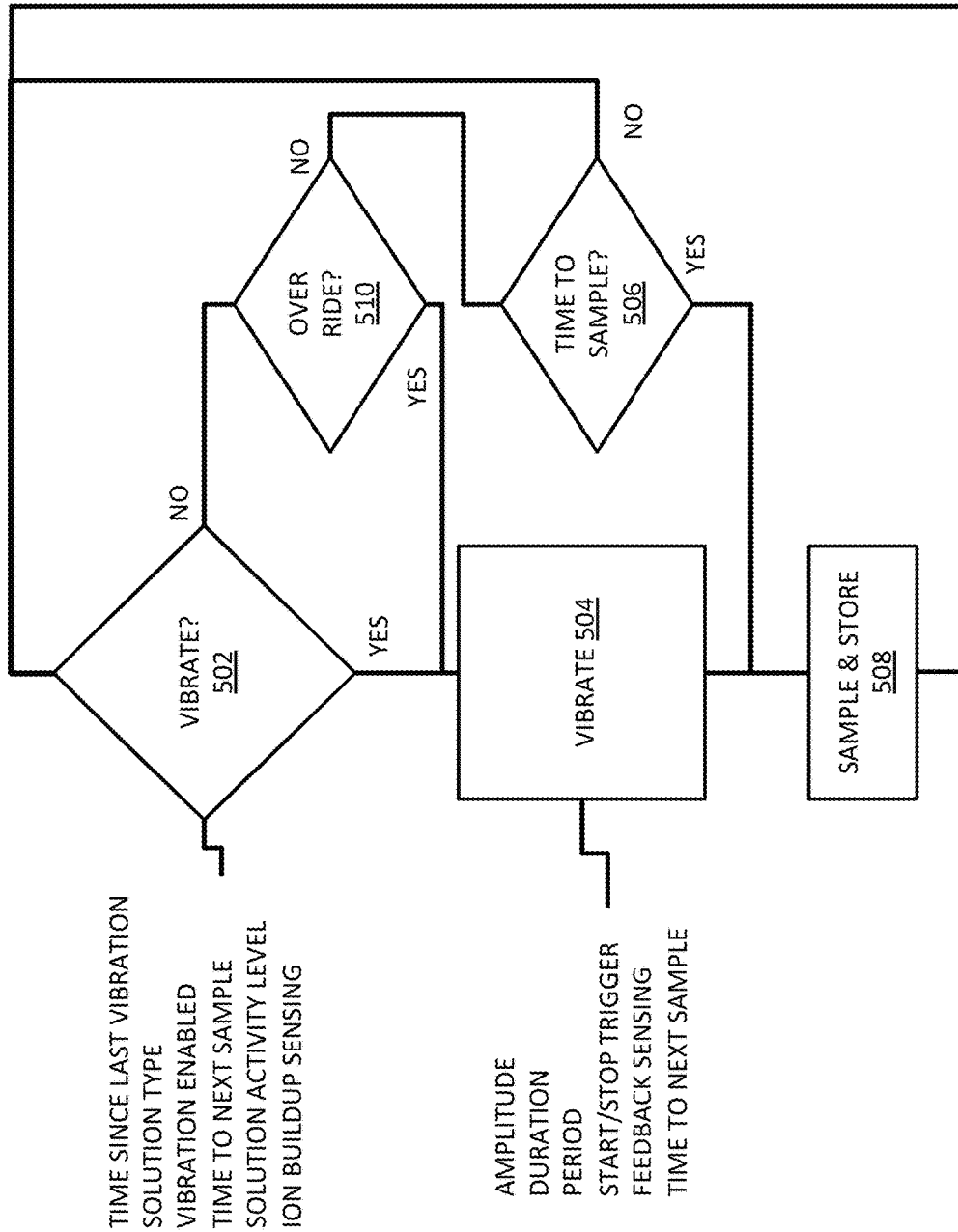
FIG. 5 depicts a flow chart of vibration and pH sample timing.

Referring to FIG. 5, that depicts a flow diagram, methods and systems for use of a self-vibrating pH probe are depicted. Sampling pH may be coordinated with vibration of the pH probe tip or the solution proximal to the probe tip to effect a reduction in ion buildup that may interfere with pH sensing. A basic sequence consisting of vibration steps and sensing steps may be configured to gain the benefit of mitigating an impact of ion deposition during pH sensing. In the embodiment of FIG. 5, a processor evaluates various parameters, including fixed, variable, and time-dependent parameters related to pH sensing with a self-vibrating pH sensor or the equivalent in step 502 to determine if vibration should be performed. An algorithm that may be executed by the processor may include calculating an elapsed time since the last vibration event. By recording a time stamp for each vibration event and referencing a time keeping source, the algorithm may determine how much time has elapsed since the last vibration event. Depending on the degree of detail needed, this elapsed time may be calculated in seconds, some portion thereof (e.g., milliseconds, and the like), or some unit of time greater than a second.

Determining if vibration should be performed may result in a decision to perform vibration; however it may result in a decision to not perform vibration. Either or both of these decisions may be stored along with a time stamp to keep track of when such vibration event decisions are made. This may allow for overriding a future decision that would result in vibration not being performed. As an example, if an amount of time since the last actual vibration event exceeds a threshold, even when an assessment of the conditions for deciding on executing vibration results in a decision to not perform vibration, if this threshold is exceeded, vibration may be performed. In this way, if a condition that indicates vibration should not be performed persists, potentially resulting in impactful ion buildup, this maximum time between vibration events may facilitate activating vibration as a default action.

A calculation of if vibration should be performed can also produce an anticipated time for when vibration may be beneficial. In an example of this embodiment, through the use of time stamping each vibration event, basic functions such as average, maximum, median, minimum and the like could be applied to the data to predict various time-based parameters for a next vibration event. This information may be useful when determining if a vibration event should occur. It may also be useful in determining if a current time since last vibration event is out of bounds, such as if it is shorter than a minimum or longer than a maximum calculated from stored vibration event time-stamp data.

The step of deciding if vibration should occur may also include processing other parameters than time. Parameters that may be processed may include a sampling solution type. This may be helpful in determining when a vibration event should occur because different types of solution may react differently to vibration events. The amount of time from when a vibration event ends to when the solution would be stable enough to be sampled could vary based on the density of the solution. This parameter may be interrelated with vibration profile, vibration element positioning, and the like as described elsewhere herein. Another parameter that vibration event decision step 502 may process is if vibration is enabled for this sampling activity. While vibration may generally be beneficial to dispersing ion buildup on a pH probe tip. There may be times, such as during cleaning, calibration, and the like, when vibration may simply not be desired. These times may be preconfigured (e.g., at the end of a pH sampling cycle), determined based on other conditions (e.g., when new solution is being added), and the like.

Yet another parameter that may be processed when determining if a vibration event should occur may include an amount of time remaining until the next pH sample event. This information may be determined by comparing a current time to a stored next pH sample time. The difference would generally indicate an amount of time until the next sample event. This information may be useful in that vibrating to far ahead of the next sample event may result in ion buildup occurring again before the next sample event. Vibrating too close to a sample event may cause the sampling to occur while ion buildup is being dispersed, but has not yet stabilized, or even worse, while vibration overlaps sampling.

Factors such as solution activity level, which may be sensed or predefined, may also impact a decision of if and/or when to activate a vibration event. When a solution activity level, which may be comparable to turbulence, or rate of flow is high, ion buildup is mitigated. Therefore, vibration may be performed less often or may be disabled depending on the degree the activity level. When a solution activity level is low, self-vibration may be performed at least prior to each sample event and may be performed more the once between sample events. Vibration may be performed even when a sample event is not scheduled so that the ion buildup on the pH probe tip remains under control. If ion buildup sensing is available, data from such as sensor may be utilized when determining when or if vibration should be performed.

When vibration is determined in step 502 to not be performed, control may be passed to an algorithm in step 510 that may check parameters for overriding a decision to not perform vibration. Described above are a few examples, such as exceeding a threshold of time since a last vibration event, and the like when overriding a decision to not vibrate may make sense.

If the result of vibration event decision step 502 or the override step 510 indicates that vibration should be performed, control may be passed to a vibration event step 504. A vibration event may be configured and performed in step 504. Vibration control parameters, such as vibration amplitude, vibration duration, vibration profile, vibration period, vibration element position, vibration type (e.g., direct, indirect, or solution-based), presence/absence of a vibration trigger (e.g., a physical signal that can be sensed and/or a logical signal that can be represented by a data value), various feedback sensing data (e.g., ion buildup amount, solution turbidity), time to next sample event, and the like may be sampled. A control set for a vibration event may be captured and stored in a memory that is accessible to a vibration control application that uses the captured and stored data to perform the vibration event.

If, at step 502 and 510 vibration is not to be performed, pH probe sensing time is evaluated. Simply comparing a current time to a next sample time may perform this. Sample times may be periodic, highly random, and/or impacted by external events or triggers. Similarly to the range of time-related factors that are described above for deciding if and when to vibrate, sample time-related factors may be processed in sample time evaluation step 506. If, a result of processing sample time factors results in a call to perform a sample event, control may be passed to the sample and store step 508. If the result of processing sample time related factors indicates that it is not time to sample, control may be passed back to the vibration decision step 502.

After a vibration event is complete, pH sampling and data storage may be performed in step 508. The entire cycle of vibration event decision, optional vibrating, and sampling may be repeated.

Referring to FIG. 6 in which is depicted a table of vibration value, vibration control parameters may be organized by pH sampling solution class. In the embodiment of FIG. 6, various exemplary solution classes are listed in a first column of a vibration mode control table. For each type of solution class, parameters to facilitate selection of an appropriate vibration control set are made available. In this example, a recommended or predefined vibration profile for a solution class A1 is a pulse type vibration profile. Also recommended by the content in this table for a solution class A1 is a vibration amplitude that is no more than 75% of maximum. Sample delay of 3 seconds before sample and at least 1 second after sample and a pH range of 3 to 6. These exemplary values are merely illustrative and not meant to represent an actual deployment of the methods and systems described herein. Further in the example of FIG. 6, the last entry in the table indicates that solution class K does not require vibration; therefore entries for amplitude and sample delay are marked as N/A. Although the table shows a value of N/A, it may be possible that this value is actually a digital value in a range, such as 0% to 100% for Amplitude and 0.1 to 50 for sample delay. However, a pH range may still be specified.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A self-vibrating pH probe comprising:
a housing containing an electronic assembly adapted to support detecting pH of an environment;
a vibration source disposed so that at least a portion of vibrations caused by the vibration source propagate to the electronic assembly, the vibration source being controllable for at least on/off operation;
a pH probe member having a probe tip at a first end, the probe member extending from the housing and mechanically and electrically coupled by a second end to the electronic assembly so that at least a portion of vibrations propagating to the electronic assembly further propagate to the probe tip; and
a processor coupled to the electronic assembly and adapted to coordinate operation of the vibration source and operation of the pH probe member including controlling when the vibration source is activated relative to when a sample of pH is taken by the pH probe.

2. The probe of claim 1, wherein coordinating operation of the vibration source comprises controlling a vibration amplitude.

3. The probe of claim 1, wherein coordinating operation of the vibration source comprises controlling a vibration profile.

4. The probe of claim 1, wherein at least one of vibration amplitude, vibration duration, or a delay between vibration and pH sampling is adjusted by the processor using an algorithm for controlling producing vibration by the vibration source.

5. The probe of claim 1, wherein the vibration source comprises a piezoelectric device.

6. The probe of claim 1, wherein the vibration source comprises an offset-weight rotary device.

7. The probe of claim 1, wherein coordinating operation of the vibration source comprises calculating at least one of a duration, delay time, amplitude, and period for the vibrating.

8. A method of dispersing ion buildup on a pH probe comprising controlling a vibration source to cause vibration of a portion of the pH probe through direct coupling of the vibration source with a structural portion of the pH probe; wherein vibrating the vibration source is controlled by a processor relative to when the processor controls pH sampling of a medium that is in contact with the portion of the pH probe.

9. The method of claim 8, wherein the processor executes a vibration control algorithm to control the vibration source, the algorithm comprising determining at least two controllable aspects of the vibration source selected from the list consisting of amplitude, oscillation frequency, duration, period, start time, stop time, and delay between the stop time and the start time.

10. The method of claim 8, wherein vibrations produced the vibration source occur synchronously with sampling the medium.

11. The method of claim 10, wherein a delay between producing vibrations with the vibrating source and sampling the medium is determined by the processor in response to a class of the medium.

12. The method of claim 10, wherein a vibration control profile is determined by the processor in response to a class type classification of the medium.

13. The method of claim 10, wherein a delay between the produced vibrations and sampling the medium is greater than a minimum predefined pre-sample delay.

14. The method of claim 10, wherein there is a configurable offset between operation of the vibrating source and sampling of the pH of the medium.

15. A method of dispersing ion buildup on a probe, a portion of which is immersed in a medium, the method comprising vibrating the medium that is in contact with the probe with a vibration element that causes vibration of the medium proximal to an immersed portion of the probe through immersion of a portion of the vibration element in the medium and vibrating the vibration element; wherein vibrations produced by the vibration element are controlled by a processor that further controls sampling of the medium via at least one sensor disposed in the medium, wherein the processor further controls activating the vibration element relative to sampling of the medium.

16. The method of claim 15, wherein vibrations produced by the vibration element occur synchronously with sampling the medium.

17. The method of claim 16, wherein a delay between vibrations produced by the vibrating element and sampling the medium is determined by the processor in response to a classification of the medium.

18. The method of claim 16, wherein a vibration control profile is determined by the processor in response to a class type classification of the medium.

19. The method of claim 16, wherein a delay between the vibrations and sampling the medium is greater than a minimum predefined pre-sample delay.

* * * * *